United States Patent Office 3,455,673
Patented July 15, 1969

3,455,673
COMPOSITIONS AND METHODS FOR REGULATING THE GROWTH OF PLANTS
Hilary F. Goonewardene, Moorestown, N.J., and Bernard Loev, Broomall, Pa., assignor to Smith Kline & French Laboratories, Philadelphia, Pa., a corporation of Pennsylvania
No Drawing. Continuation-in-part of application Ser. No. 422,398, Dec. 30, 1964. This application Dec. 8, 1967, Ser. No. 688,990
Int. Cl. A01n 21/02, 5/00; C07c 101/00
U.S. Cl. 71—76
2 Claims

ABSTRACT OF THE DISCLOSURE

O-alkyl carbamates, both straight and branched, are disclosed as having selective plant growth stimulant utility. Methods of synthesis of the novel alkyl carbamates are disclosed.

---

This is a continuation-in-part application of our copending application, Ser. No. 422,398, filed Dec. 30, 1964, now abandoned.

The present invention relates to compositions which regulate the growth of plants. In another aspect it relates to certain carbamates that favorably effect the growth characteristics of plants by selective acceleration of germination, enhancement of root development, and reduction of aerial growth.

Preparation of the lower alkyl carbamates is well established chemistry; see, e.g. Choppin et al., J. Am. Chem. Soc., 70:2967 (1948), and Loev and Kormendy, J. Org. Chem., 28:3421 (1963). Many carbamate derivatives have attained great importance because of their selective action as weed killers, but few carbamates have been suggested as plant stimulants, e.g. only certain O-aryl carbamates.

Surprisingly, we have now found that more simply prepared carbamate derivatives, the O-lower alkyl carbamates have a significant influence on the growth of plants when applied within the herein specified dose ranges. These carbamates have the general formula:

$$R'-\underset{\underset{R''}{|}}{\overset{\overset{R}{|}}{C}}-O-\overset{\overset{O}{\|}}{C}-NH_2$$

wherein R, R' and R" represent hydrogen or lower alkyl of up to 3 carbon atoms. Advantageous compounds are those where all the R's are lower alkyl. Advantageous and preferred carbamates are tertiary alkyl up to 5 carbon atoms.

The following useful agricultural applications due to selective growth regulation can be cited:

Improvement of fruit quality, e.g. of grapes.
Increasing the ratio of large green lemons, for storage and marketing as fresh lemons, generally as to small yellow lemons that are processed into juice.
Adjustment of harvest time—could be used for adjusting peak harvest to peak sales, or inhibition of preharvest dropping of fruit.
Production of lettuce seed to induce bolting.
Treating barley during malting to increase enzyme content of malt.
Seed treatment to promote earlier germination and enhance root growth.
Increase yield, e.g. of corn.
As an aid for plants to grow out of disease condition, e.g. sour cherry trees infected with yellow's virus.
Increase size and color development and delay ripening of limes.
Delay dormancy and therefore protect plants from early frost damage, e.g. peaches, grapes.
Dwarf aerial growth of plants.

Several of the phenomena listed above are attained with the disclosed compounds under chosen conditions and recited dose ranges. Phytotoxic effects leading to the death of the plant can be caused by increasing the concentration significantly beyond the disclosed range.

It may be desirable during machine harvesting, in order to provide short sturdy stalks, particularly in cereals and dwarfing of aerial growth, as an aid for harvesting of apples and other tree fruit crops. An enhanced root system will aid a plant in overcoming the vagaries of the environment, e.g. adverse moisture balance conditions and overcoming soil pathogens.

This growth stimulation of young plants, particularly from the seed stage, has been demonstrated with the seeds of both corn and beans.

The following are illustrative of O-alkyl carbamates that may be utilized according to the present invention.

Methyl carbamate
Ethyl carbamate
n-Propyl carbamate
Iso-propyl carbamate
n-Butyl carbamate
Sec-butyl carbamate
Isobutyl carbamate
Tert-butyl carbamate
n-Amyl carbamate
Sec-amyl carbamate
Isoamyl carbamate
Tert-amyl carbamate
n-Hexyl carbamate
Sec-hexyl carbamate
Heptyl carbamate
Isooctyl carbamate
Diethyl methyl carbinyl carbamate
Triethyl carbinyl carbamate
Tert-octyl carbamate The methods of synthesis of the aforedescribed alkyl carbamates are generally known and do not form a part of the invention of the present disclosure. Numerous references in the literature teach practical means for their synthesis, i.e. Choppin et al., supra, and U.S. Patent No. 3,072,710 to Flores and Loev teaching an improved process for the preparation of a variety of alkyl carbamates.

In any event, chemists skilled in the art of carbamate synthesis can readily provide large-scale methods of preparation of active carbamates within the scope of this invention.

Dependent on the intended use and the form of application, the concentration of the active ingredient in formulations ready for use can vary within wide limits. High concentrations can be used in particular in dusts for the treatment of the soil, and fairly high concentrations from about 0.1–2% can be used for application to a part of the plant only, e.g. for treating the ends of cuttings so as to stimulate root formation. Low concentrations can be used for example in emulsions in which cuttings are dipped or placed for a long time to stimulate root formation.

Very low concentrations can be used also when the active ingredients are applied to the soil by watering or in fertilizers. In soil treatment, there is, in general, no necessary relationship between the concentration and the amount of active ingredient taken up by the plant, since a lower concentration of active ingredients can be equalized by increasing the total amount of the agent applied. There is therefore, a very great range of possible concentrations.

The optimum concentration for a particular crop must be determined by empirical methods.

Directly dependent on the concentration however, is the amount of active ingredient taken up by the plant when it is applied in aqueous suspensions and emulsions which are sprayed on to the parts of the plant above the ground, in particular on to the leaves up to the run-off point. The concentration for such agents lies between about 0.01% and 2%. These agents are prepared immediately before use from concentrates of the active ingredient which contains many times the amount of chemical that is to be applied. In cases of concentrates for the preparation of emulsions of liquid active ingredient, and for the preparation of suspensions of solid active ingredient, the concentration can be as high as about 90%.

The active substances can be used in solvents or formulated as emulsions or powders or granules. The compounding of the active substances depends entirely on the intended crop, field conditions, and proposed method of application.

Solvents such as, in particular, alcohols; ketones such as acetone, diacetone alcohol or cyclohexanone, aliphatic hydrocarbons, such as kerosene; and cyclic hydrocarbons, such as benzene, toluene, xylene, tetrahydronaphthalene, alkylated naphthalenes; also chlorinated hydrocarbons, such as tetrachlorethane, ethylene chloride; and finally also high boiling organic solvents such as mineral and vegetable oils, dimethyl sulfoxide, methyl pyrroline, or mixture of the above named substances can be used for the production of solutions.

Chiefly, emulsions and suspensions are meant for aqueous forms of application. The substances as such or in one of the above named solvents, are homogeneously incorporated into water, preferably by means of wetting or dispersing agents. On the other hand, concentrates suitable for dilution with water can be produced which consist of active ingredient, emulsifier or spreader or surfactant and possibly a solvent.

Quaternary ammonium compounds; soap, soft soap, aliphatic sulphuric acid monoesters having long chains, aliphatic aromatic sulphonic acids, alkoxy acetic acids having long chains; polyethylene ethers or fatty alcohols and polyethylene condensation products can be named as examples of cation active, anion active and nonionogenic emulsifying or dispersing agents respectively.

Dusting agents can be made simply by mixing or grinding together the active ingredient and a solid carrier. As such solid carriers can be named: talcum, diatomaceous earth, kaolin, bentonite, calcium carbonate, boric acid, precipitated silicas, tricalcium phosphate, also powdered wood, powdered cork, charcoal and other materials of vegetable origin. On the other hand, the substances can also be drawn on to the carriers by means of a volatile solvent. Pulverulent preparations and pastes can be suspended in water by the addition of wetting agents and protective colloids and so used as spraying agents.

The various forms of application can be adapted to the intended use in the usual way by the addition of substances which improve the distribution, the adhesive properties, resistance to rain and, possibly, the penetrating powers. Such substances are, for example, fatty acids, resins, alkyl celluloses and other such agents, wetting agents, glue, casein or alginates. In the same way, the biological activity can be increased by the addition of substances which have a bacterial or fungicidal action or of substances which also influence the growth of plants. Fertilizers may also be added.

A few chosen examples follow which illustrate the range of application described above. The results are also given.

Graminaceous monocotyledons, as exemplified by corn, are beneficially effected by the practice of this invention, as demonstrated below:

GROWTH REGULANT TEST PROCEDURE

Example 1

Fifteen corn seeds (var. Golden Bantam, certified 98% germination) are placed in a 100 x 15 mm., (N 1001— B & D Labs., Inc.) plastic petri dish, the bottom of which is lined with a piece of blotting paper. The seeds are first wet with 5 ml. of distilled water, and then with the appropriate quantity of chemical in an additional 2 ml. of distilled water. A 1% solution of test chemical is used for the dilutions, having 1000 mg./100 ml. or 20 mg. chemical/2 ml. of water. Serial dilutions were then made as follows:

2 ml. of 1% w./v. solution: 20 mg./2 ml.+5 ml. $H_2O$=2.857 mg./ml.

1.0 ml. of 1% w./v. solution: 10 mg./2 ml.+5 ml. $H_2O$=1.428 mg./ml.

0.5 ml. of 1% w./v. solution: 5 mg./2 ml.+5 ml. $H_2O$=0.714 mg./ml.

0.25 ml. of 1% w./v. solution: 2.5 mg./2 ml.+5 ml. $H_2O$=0.357 mg./ml.

0.125 mg. of 1% w./v. solution: 1.25 mg./2 ml.+5 ml. $H_2O$=0.178 mg./ml.

Two petri dishes are run at each concentration. To each control petri dish are added 7 ml. of distilled water. The dishes are placed in Mangledorf germinator run at 26° C. or 76° F.

When the primary root emerging from each seed is approximately 1 mm. in length, the seed is considered as germinated. These germinated seeds are transferred to clay pots for the rest of the study. The pots to which germinated seeds are transferred are prepared as described below.

The drainage in 6-inch clay pots are covered over. Perlite (glassy rock) is thoroughly saturated, allowed to drain, and added to the pots to a height of 1½ inches from the top of each pot. Thus, in the pots a planting depth of 1½ inches is provided. After the seeds are placed in the pots, each pot is filled to the brim with water-saturated perlite. These pots are watered 12 hours later.

The pots are then placed on a greenhouse bench, according to the Huden Square design, on boards, to prevent root growth into the greenhouse bench soil. Each pot is labelled according to the experimental design (bottom to top of Row 1—1, 2, 3, 4, 5 and Row 2—6, 7, 8, 9, 10 and so on).

All pots are watered daily. The pots are given 250 ml. of a N–P–K nutrient solution per pot. The first application is made about 17 days after the commencement of the experiment. Repeat applications are made at 10-day intervals.

The plants are first harvested when control plants have attained a height of 6.5 inches. The plants are watered 24 hours prior to harvest. Individual plants are removed from the pots, and wet weights of the entire plant and root are taken. The plants are dried in a 52° C. oven for 48 hours and the weights of the root and tops are recorded.

When the candidate chemical evaluated according to the foregoing procedure is the exemplary tert-butylcarbamate, SK & F No. 11050, the results of acceleration of germination are as shown in Table I.

TABLE I

[Germination [1] of corn (var. Golden Bantam, certified 98% germ.)]

| Hours from treatment to germination | Concentration of SK & F 10050 | | |
|---|---|---|---|
| | Control, percent germination corn | 0.125% w./v., percent germination corn | 0.25% w./v., percent germination corn |
| 90 | 56.6 | 76.6 | 53.3 |
| 96 | 76.6 | 86.6 | 76.6 |

[1] Criterion for germination is radicle length of 1 mm.

The corn plants are measured prior to harvest to determine the effect of the chemical on aerial growth. The results of these measurements employing SK & F No. 11050 are shown in Table II.

TABLE II

[Height in centimeters of corn plants (var. Golden Bantam, certified 98% germination)]

| Percent w./v. | Height in cm. | | | |
|---|---|---|---|---|
| | I | II | III | Avg. |
| Control | 3.8 | 5.17 | 6.17 | 4.05 |
| .125 | 3.32 | 5.14 | 5.64 | 4.70 |
| .250 | 3.33 | 4.68 | 6.23 | 4.75 |
| .5 | 1.99 | 4.31 | 5.32 | 3.83 |
| 1.0 | 2.42 | 2.42 | 3.33 | 2.50 |

These results illustrate the substantial reduction in aerial growth which is often desired to minimize damage by the environment, e.g. moisture in balance, especially if complemented by enhanced root system growth.

The corn plants, which had been treated with the candidate chemical, at the optimum level of 0.125% w./v., were subjected to further examination to determine the development of both of normal and adventitious root systems. The results of these measurements are shown in Table III.

TABLE III

[Percent root development in corn (var. Golden Bantam, certified 98% germination)]

| | Harvest | | | Remarks | |
|---|---|---|---|---|---|
| | I | II | Total | Average length of normal roots, 2 reps.— 6 plants (in.) | Average length of adventitious roots, 2 reps.— 6 plants (in.) |
| Control | 63.4 | 66.3 | 129.7 | 8.3 | [1] 2.4 |
| .125% | 57.9 | 93.2 | 151.1 | 9.0 | [2] 5.93 |

[1] Little or no branching.
[2] Desirable profuse branching.

The above results illustrate the significant enhancement of root development and, in particular, the striking enhancement of the adventitious root system.

The above data further illustrates the criticality of employing the disclosed stimulants in the recited dose ranges to minimize phytotoxicity. As pointed out previously, the effective concentration range for a particular active ingredient in a certain formulation for a specific crop must be determined by routine preliminary tests. When the methods of this invention are applied judiciously, significant growth regulant effects will be achieved as desired.

Various modifications and alterations of this invention will become apparent to those skilled in the art without departing from the scope and spirit of the invention, and its should be understood that the latter is not necessarily limited to the aforementioned disclosure.

What is claimed is:

1. A method of accelerating the germination of corn plants which comprises treating seeds in an amount and concentration sufficient to reduce the aerial growth with a carbamate of the general formula:

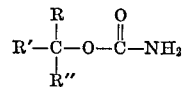

wherein R, R' and R'' are lower alkyl of up to 3 carbon atoms and selected from the group consisting of tert-butyl carbamate, tert-amyl carbamate and tert-octylcarbamate.

2. The method of claim 1 wherein said carbamate is tert-butyl carbamate.

References Cited

UNITED STATES PATENTS

| 2,776,197 | 1/1957 | Gysin et al. | 71—77 |
| 2,812,247 | 11/1957 | Gysin et al. | 71—77 |
| 3,072,710 | 1/1963 | Flores et al. | 260—482 |
| 3,092,551 | 6/1963 | Ancel | 260—482 |
| 3,129,137 | 4/1964 | Beyer | 260—482 |
| 3,356,483 | 12/1967 | Leasure et al. | 71—77 |
| 3,356,715 | 12/1967 | Newallis et al. | 71—106 |
| 3,385,691 | 5/1968 | Strycker | 71—77 |

OTHER REFERENCES

Choppin et al., "t-butyl Carbamates," 1948, J.A.C.S. 70, p. 2967, QD 1A5.

Lanza et al., "Action de Diverses Subs., etc.; Bull. Soc. Pharm. Marseille 13 (52), pp. 271 and 273–79 (1964).

LEWIS GOTTS, Primary Examiner

G. HOLLRAH, Assistant Examiner

U.S. Cl. X.R.

71—77, 106; 260—482